(12) United States Patent
Romanyszyn et al.

(10) Patent No.: US 6,649,059 B2
(45) Date of Patent: Nov. 18, 2003

(54) APPARATUS FOR TREATING FLUIDS

(75) Inventors: Michael T. Romanyszyn, San Antonio, TX (US); Perry McGuar, San Antonio, TX (US)

(73) Assignee: Lancer Partnership, Ltd., San Antonio, TX (US)

( * ) Notice: Subject to any disclaimer, the term of this patent is extended or adjusted under 35 U.S.C. 154(b) by 0 days.

(21) Appl. No.: 10/016,491

(22) Filed: Dec. 10, 2001

(65) Prior Publication Data

US 2003/0006203 A1 Jan. 9, 2003

Related U.S. Application Data

(63) Continuation-in-part of application No. 09/899,467, filed on Jul. 5, 2001.

(51) Int. Cl.$^7$ .............................. B02C 19/06; C02F 1/20
(52) U.S. Cl. ................. 210/512.2; 210/188; 210/512.1; 210/738; 210/787; 241/5; 241/39; 366/162.4; 366/162.5; 366/173.2; 417/171; 417/194
(58) Field of Search ................................. 210/787, 188, 210/512.1, 512.2; 241/4, 39; 366/162.4, 162.5, 173.2; 417/171, 194

(56) References Cited

U.S. PATENT DOCUMENTS

| | | | | |
|---|---|---|---|---|
| 4,261,521 A | * | 4/1981 | Ashbrook | 241/5 |
| 5,435,913 A | * | 7/1995 | Ashbrook | 210/512.1 |
| 6,045,068 A | * | 4/2000 | Ashbrook | 241/5 |

* cited by examiner

Primary Examiner—David A. Reifsnyder
(74) Attorney, Agent, or Firm—Christopher L. Makay

(57) ABSTRACT

In a method and apparatus for treating fluids, a pump delivers a fluid flow from a fluid source to a manifold. The manifold divides the fluid flow into first and second fluid flows, which are delivered from the manifold to a housing. The housing includes therein a first vortex nozzle positioned in opposed relationship to a second vortex nozzle. The first fluid flow enters the first vortex nozzle to create a first rotating fluid flow, and the second fluid flow enters the second vortex nozzle to create a second rotating fluid flow. The first and second vortex nozzles impinge the first and second rotating fluid flows in a collision chamber, thereby treating the fluid.

29 Claims, 12 Drawing Sheets

APPARATUS FOR TREATING FLUIDS

CROSS REFERENCE TO RELATED APPLICATION

This application is a continuation-in-part of U.S. application Ser. No. 09/899,467, which was filed Jul. 5, 2001 and is still pending.

BACKGROUND OF THE INVENTION

1. Field of the Invention

The present invention relates to a method and apparatus for treating fluids and, more particularly, but not by way of limitation to an improved fluid delivery system for transporting a fluid to a vortex nozzle assembly housed therein.

2. Description of the Related Art

U.S. Pat. No. 4,261,521 discloses a vortex nozzle assembly constructed with a pair of vortex nozzles positioned within a housing in opposed relationship. The housing maintains the axial alignments of the nozzles and their respective nozzle exits and, further, introduces fluid into the vortex nozzles. The fluid enters an interior tapered vortex tube of each vortex nozzle through a straight, round, port tangent to a toroidal cavity. The toroidal cavity is adjacent to a large end of the tapered, conical vortex tube, which is normal to the nozzle axis. The fluid departs from this toroidal section and progresses spirally out toward a nozzle exit as more fluid continuously enters the port. The transition from the toroidal shape to the conical shape is critical. If the inside edge of the cone is tangent to the outside of the toroid, the fluid exits too quickly to form complete coverage of the interior of the vortex tube. Conversely, if the inside edge of the cone starts at the bottom quadrant of the torrous, the exiting fluid interferes with the incoming flow and causes much turbulence.

As fluid is forced spirally out each vortex tube, centrifugal energy flattens a circular section of fluid against the side of the tapered vortex tube. This action accelerates the fluid as it spirals out toward the exit, creating a void inside the vortex tube chamber. When the fluid exits the walls of the vortex tube, it accelerates radially forming a hollow fluid cone. The hollow fluid cone from one vortex nozzle impacts with the hollow fluid cone from the other vortex nozzle inside the housing, which forms a liquid lined, closed chamber. This closed chamber develops a substantial vacuum due to the void caused by the centrifugal energy of the vortex. The energy from the impact of the two hollow fluid cones in the presence of this substantial vacuum effects changes to the fluid.

It is desirable and beneficial for the fluid to form a uniform and thin film, thus exposing the maximum amount of the surface area of the fluid to the effect of the vortex chamber. Additionally, this thin film of fluid becomes the interior liquid wall of the vortex reaction chamber. If the fluid is not uniformly distributed down the walls of the tapered vortex tube when it exits the nozzle, instabilities will develop in the impact pattern between the two nozzles leading to inefficiencies in nozzle performance. These irregularities in fluid distribution are inherent when one starts with a single, circular fluid cross-section entering normally to the axis of the nozzle and attempts to develop that fluid into a uniform, thin-filmed annular section.

Increasing the length of the vortex tube aids in the uniform film development by allowing the fluid more time to develop a stable flow pattern; unfortunately, the additional length greatly increases the frictional losses. These frictional losses lessen the impact energy when the two hollow fluid cones exiting the nozzles collide, thereby limiting the efficiency of the nozzle. The added length also decreases the centrifugal energy available, as the length must be added to the large end of the vortex tube. This makes the toroidal section larger and decreases the rotational speed for a given inlet velocity.

U.S. Pat. No. 5,435,913 adds another inline vortex tube to each nozzle to eliminate a singular entrance port. This has some beneficial effect, particularly when the paired vortex tubes are properly sized and positioned relative to each other. However, properly sizing and positioning of the tandem design nozzle pairs can prove challenging. One must carefully determine the relative sizes and placements as the vortex tube can interfere rather than amplify each other.

Accordingly, there is a long felt need for an improved fluid delivery system for transporting a fluid to a vortex nozzle assembly housed therein. The improved fluid delivery system more efficiently transports fluid to permit a more uniform film thickness in an individual vortex nozzle of the vortex nozzle assembly. The improved fluid delivery system further provides greater application design latitude but in a less complicated arrangement as was accomplished with either the single entry or the tandem nozzle design.

SUMMARY OF THE INVENTION

In accordance with the present invention, an apparatus for treating fluids includes a pump, a housing including therein a first vortex nozzle positioned in opposed relationship to a second vortex nozzle, and a manifold that delivers a flow of fluid from the pump and to the housing. The pump includes an inlet coupled with a fluid source and an outlet coupled with the manifold. The pump resides on a pump support adapted to permit rearward and pivotal movement of the pump. In addition, the pump may be oriented vertically to permit the staging of pump impellers. A frame that supports the housing also supports the pump to prevent loading of the pump by plumbing connecting the fluid source to the pump.

The manifold receives a fluid flow from the pump and divides the fluid flow into a first fluid flow and a second fluid flow. Accordingly, the manifold includes an inlet coupled with the outlet of the pump, and a flow divider coupled with the inlet that actually divides the fluid flow into the first fluid flow and the second fluid flow. The manifold further includes a first elbow coupled to the flow divider and a coupling coupled with the first elbow, whereby the first elbow and the first coupling facilitate delivery of the first fluid flow to the housing. The manifold still further includes a second elbow coupled to the flow divider and a second coupling coupled with the second elbow, whereby the second elbow and the second coupling facilitate delivery of the second fluid flow to the housing.

The housing includes a first inlet that receives the first fluid flow and a second inlet that receives the second fluid flow. The housing defines a first cavity that delivers the first fluid flow to the first vortex nozzle such that the first vortex nozzle receives fluid therein and imparts a rotation to the fluid, thereby creating a first rotating fluid flow. Similarly, the housing defines a second cavity that delivers the second fluid flow to the second vortex nozzle such that the second vortex nozzle receives fluid therein and imparts a rotation to the fluid, thereby creating a second rotating fluid flow. The first and second vortex nozzles and the housing define a collision chamber where impingement of the first rotating fluid flow with the second rotating fluid flow occurs prior to exit of the fluid from an outlet of the housing.

In a method of treating a fluid, a first vortex nozzle is positioned in opposed relationship to a second vortex nozzle. A first fluid flow is inlet into a cavity surrounding the first vortex nozzle, and fluid from the first fluid flow is inlet into the first vortex nozzle to create a first rotating fluid flow. Similarly, a second fluid flow is inlet into a cavity surrounding the second vortex nozzle, and fluid from the second fluid flow is inlet into the second vortex nozzle to create a second rotating fluid flow. Finally, the first rotating fluid flow is impinged with the second rotating fluid flow in a collision chamber.

In a method of manufacturing a vortex nozzle adapted to provide vacuum measurements, a conduit is inserted through an aperture in a housing having the vortex nozzle therein. One end of the conduit is placed in a cavity of the vortex nozzle, and a self-actuating seal is secured over the aperture.

It is therefore an object of the present invention to provide an apparatus for treating fluids with sound dampening qualities.

It is another object of the present invention to provide an apparatus for treating fluids that is easy to service.

It is further object of the present invention to provide an apparatus for treating fluids that more efficiently transports a fluid to a vortex nozzle assembly.

Still other objects, features, and advantages of the present invention will become evident to those of ordinary skill in the art in light of the following.

BRIEF DESCRIPTION OF THE DRAWINGS

FIG. 12 is a perspective view illustrating a vortex nozzle of the apparatus for treating fluids.

DETAILED DESCRIPTION OF THE PREFERRED EMBODIMENTS

Figure 1:
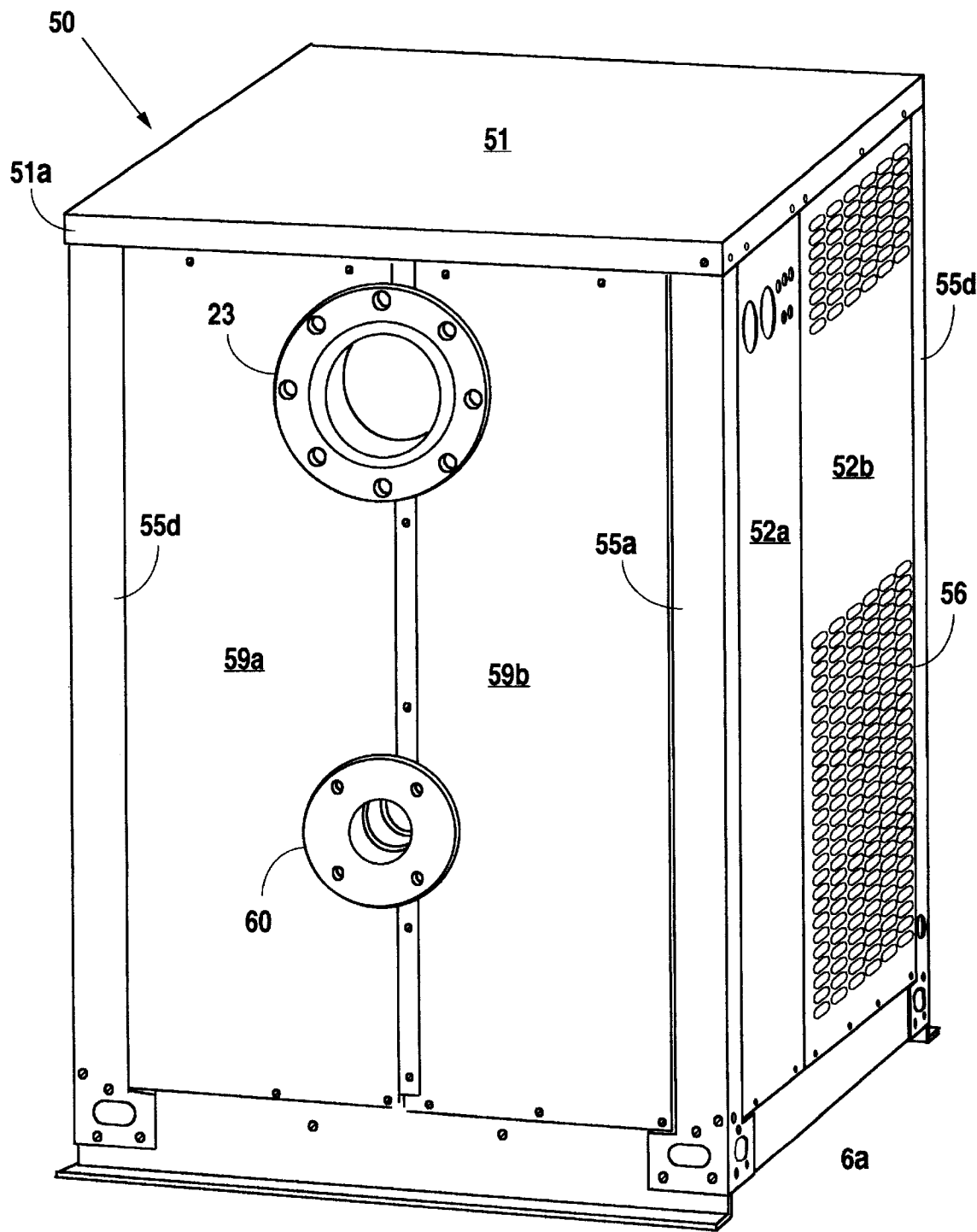
FIG. 1 is a perspective view illustrating a cabinet of an apparatus for treating fluids.
Figure 2:
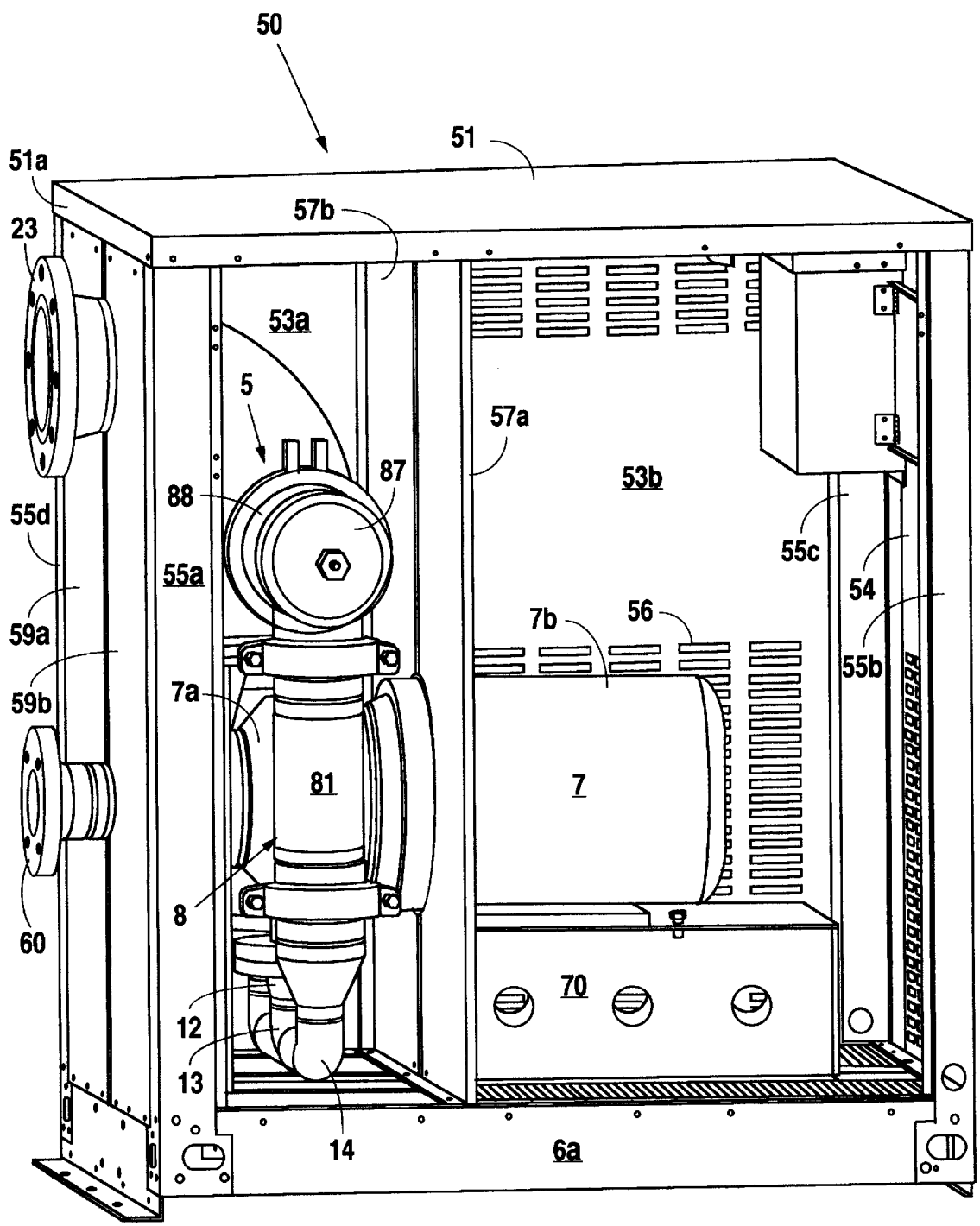
FIGS. 2–4 are perspective views illustrating a fluid delivery system according to a first embodiment of an apparatus for treating fluids.

As illustrated in FIGS. 1 and 2, a cabinet 50 of an apparatus 5 for treating fluids according to a first embodiment includes a top cover 51, sidewalls 52 and 53, a front wall 59, and a rear wall 54. The top cover 51 of the cabinet 50 is supported by the sidewalls 52 and 53, the front wall 59, and the rear wall 54, which in turn are supported and secured to a base 6a. The sidewalls 52 and 53, the front wall 59, and the rear wall 54 of the cabinet 50 are all substantially the same height and abut at the corners. Four wall supports 55a, 55b, 55c, and 55d are also secured to the base 6a. The wall supports 55a, 55b, 55c, and 55d are angle irons shaped to conform with the corners where the edges of the side walls 52 and 53, the front wall 59, and the rear wall 54 abut. The sidewalls 52, 53, the front wall 59, and the rear wall 54 secure to the wall supports 55a, 55b, 55c, and 55d at the corners using any suitable means, such as a groove and slot, riveting, fastening screws, nuts and bolts, and the like.

In this first embodiment, the front wall 59 is constructed in two sections 59a and 59b that contain semicircular gaps such that, when secured together, openings are formed to allow an inlet 60 and an outlet 23 to pass through. Similarly, the sidewalls 52 and 53 are constructed in sections, having forward sections 52a and 53a, and rear sections 52b and 53b. Furthermore, ventilation slots 56 of any configuration may be included on the cabinet 50 to allow proper ventilation of a pump motor 7b for a pump assembly 7 of the apparatus 5 for treating fluids. Of course, other openings or apertures may also be included on the cabinet 50 or the base 6a for power lines or any other need of the user.

The top cover 51 of the cabinet 50, in this first embodiment, is secured atop the sidewalls 52 and 53, the front wall 59, and the rear wall 54 using any suitable means, such as riveting, friction, fastening screws, nuts and bolts, and the like. A top cover lip 51a of the top cover 51 extends substantially perpendicular from the outer edges of the top cover 51 such that the inner side of the top cover lip 51a contacts the outer side of the sidewalls 52 and 53, the front wall 59, and the rear wall 54. Although this first embodiment illustrates a top cover 51 secured to the sidewalls 52 and 53, the front wall 59, and the rear wall 54 of the cabinet 50, those of ordinary skill in the art will recognize that the top cover lip 51a may be secured to the sidewalls 52 and 53, the front wall 59, and the rear wall 54 of cabinet 50 or that the top cover 51 may not be secured at all, but instead rest atop the sidewalls 52 and 53, the front wall 59, and the rear wall 54 of the cabinet 50.

A sound wall 57 secured to the base 6a resides within the cabinet 50. The sound wall 57 in this first embodiment is constructed from two sections 57a and 57b that each contain a semicircular gap such that, when secured together, an opening is formed to allow a pump housing 7a for the pump assembly 7 of the apparatus 5 for treating fluids to pass through. In addition, the front wall 59, the forward sections 52a and 53a, the sound wall 57, and the top cover 51 in this first embodiment are constructed so as reduce or eliminate noise created by fluid moving within a manifold 8 and a housing 9 of the apparatus 5 for treating fluids. The front wall 59, the forward sections 52a, 53a, the sound wall 57, and the top cover 51 preferably do not include openings or apertures so as to reduce sound and are preferably constructed of materials or are lined with materials that absorb or contain sound, such as foam, cork, and the like.

As illustrated in FIGS. 2–4 and 6, an apparatus 5 for treating fluids includes a pump assembly 7 having a pump housing 7a and a pump motor 7b. The pump housing 7a of the pump assembly 7 includes an inlet 60, which provides a connection point for a fluid source, and an outlet 11. The pump assembly 7 is any pump capable of pumping fluid from a fluid source through the apparatus 5. Fluid, in this first embodiment, is any flowable liquid or gas or solid particulates deliverable under pressurized gas or liquid flow. Although this first embodiment discloses a pump assembly 7 for delivering fluids, those of ordinary skill in the art will recognize many other suitable and equivalent means, such as pressurized gas canisters.

The apparatus 5 for treating fluids includes a frame 6 and a pump support 70, both of which are mounted to the base 6a using any suitable means, such as riveting, fastening screws, nuts and bolts, and the like. The pump support 70 supports the pump motor 7b of the pump assembly 7, while the frame 6 supports the inlet 60 of the pump assembly 7 via a support shelf 71a and a brace 71b. The frame 6 via the support shelf 71a and the brace 71b supports the inlet 60 so that the weight of any plumbing used in connecting the fluid source to the pump assembly 7 does not rest upon the pump housing 7a, which protects the pump seal, pump bearings, and the pump shaft from damage caused by vertical movement resulting from excess weight on the connection between the pump motor 7b and the pump housing 7a.

The pump motor 7b mounts to the pump support 70 such that, when detached from the pump housing 7a to perform maintenance or repair (e.g., replacing a seal or repacking bearings), the pump motor 7b may travel rearward along the pump support 70 towards the rear wall 54. Further, the pump motor 7b may be pivoted on the pump support 70 to permit access into the interior of the pump motor 7b. The movement of the pump motor 7b about the pump support 70 allows the rest of the apparatus 5 for treating fluids to remain assembled during maintenance or repair of the pump motor 7b or pump housing 7a, thus shortening repair times. The pump support 70, accordingly, is longer in length then the pump motor 7b to allow a reasonable range of travel so as to give greater access to the pump motor 7b or the pump housing 7a.

The apparatus 5 for treating fluids includes a housing 9 having a vortex nozzle assembly 10 disposed therein and a manifold 8 that fluidly connects the outlet 11 of the pump assembly 7 to the housing 9. The frame 6 supports the housing 9 via a support shelf 72 and a brace 76. The frame 6 via the support shelf 72 and the brace 76 supports the housing 9 and thus the manifold 8 so that their weight does not rest upon the pump housing 7a, which protects the pump seal, pump bearings, and the pump shaft from damage caused by vertical movement resulting from excess weight on the connection between the pump motor 7b and the pump housing 7a.

The support shelf 72 secures to the frame 6 using any suitable means, such as nuts and bolts or fastening screws. The brace 76 attaches to the housing 9 using any suitable means, such as welding; however, the brace 76 attaches to the support shelf 72 by sound dampening or absorbing bushings 73 in order to prevent the transfer of sound created by fluid flow from the manifold 8 and the housing 9 to the frame 6. In this first embodiment, the bushings 73 are sound absorbing rubber pieces, with one piece having a bolt shape and the other having a nut shape. A nut-shaped piece is inserted between the brace 76 and the support shelf 72 and aligned apertures through the brace 76 and the support shelf 72. A bolt-shaped piece is then inserted through the aperture of the support shelf 72, the nut-shaped piece, and the aperture of the brace 76, thereby securing the brace 76 to the support shelf 72 while providing sound dampening therebetween.

Although this first embodiment discloses sound dampening or absorbing bushings 73, those of ordinary skill in the art will understand that there are any number of sound dampening or absorbing connectors or bushings that could be used to secure the brace 76 to the support shelf 72. Furthermore, if sound dampening is not necessary, the support shelf 72 includes a plurality of connection slots that allow vertical movement of the support shelf 72 to permit the securing of the support shelf 72 directly to the brace 76.

Figure 3:
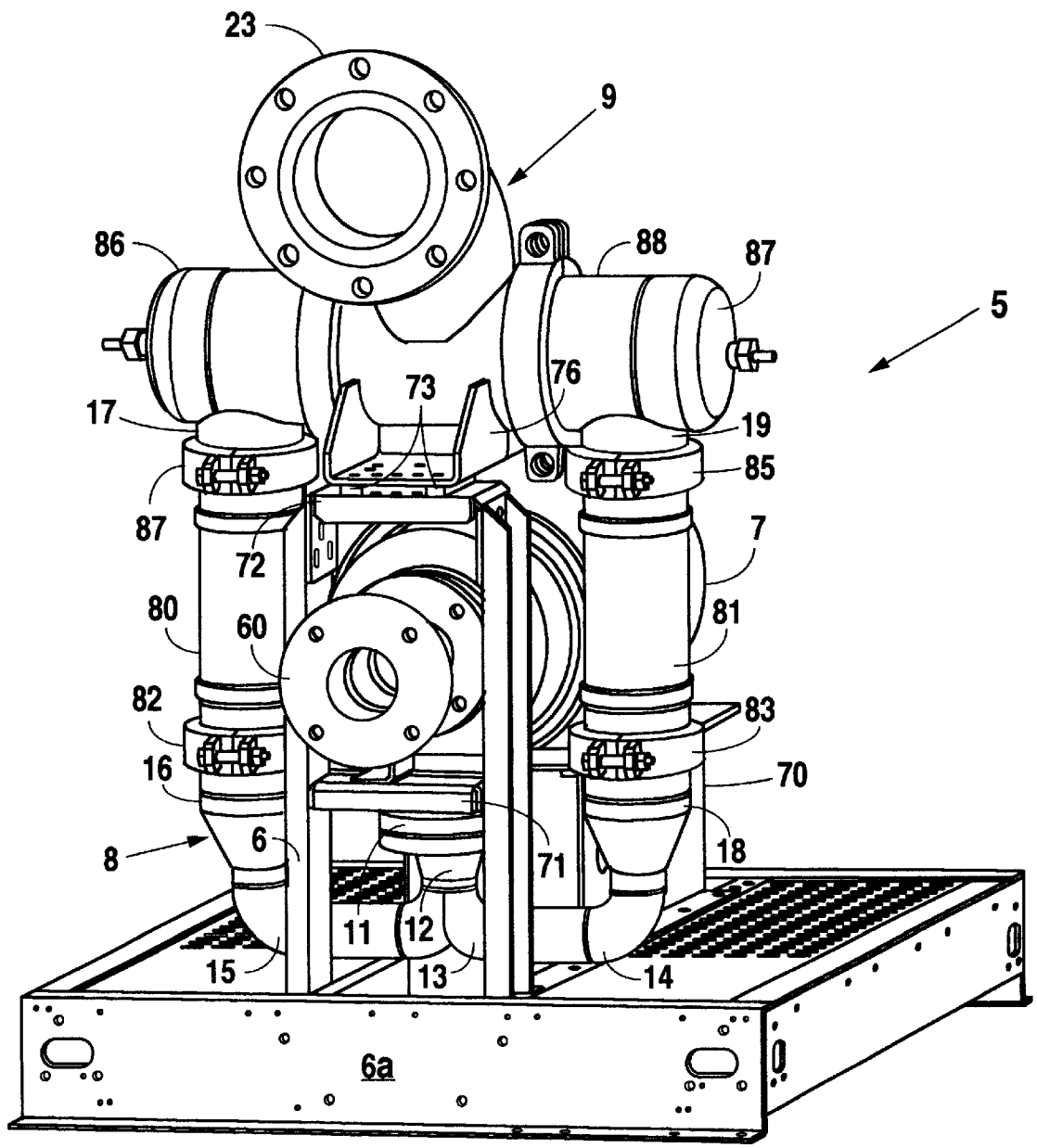
Figure 4:
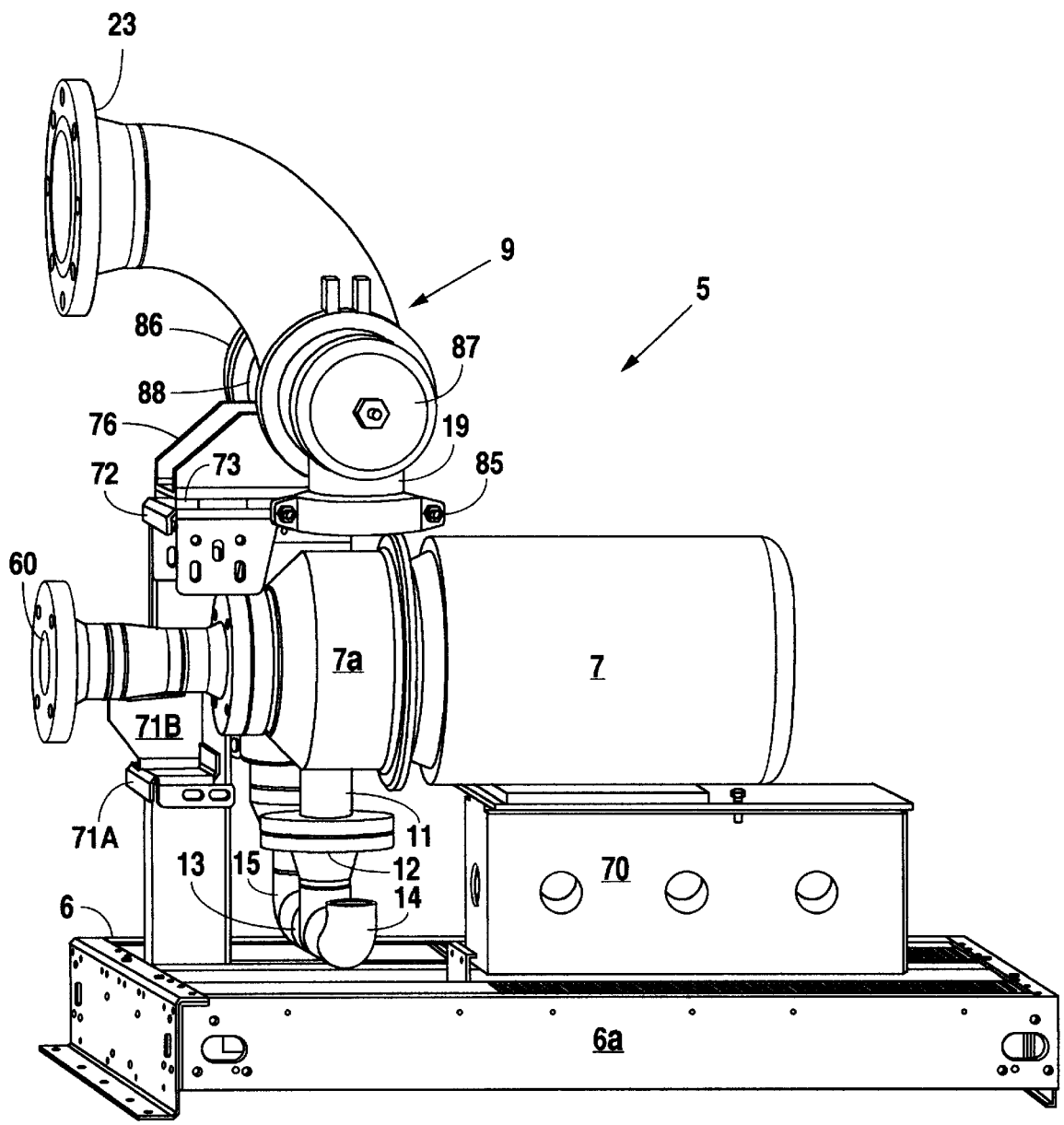
Figure 6:
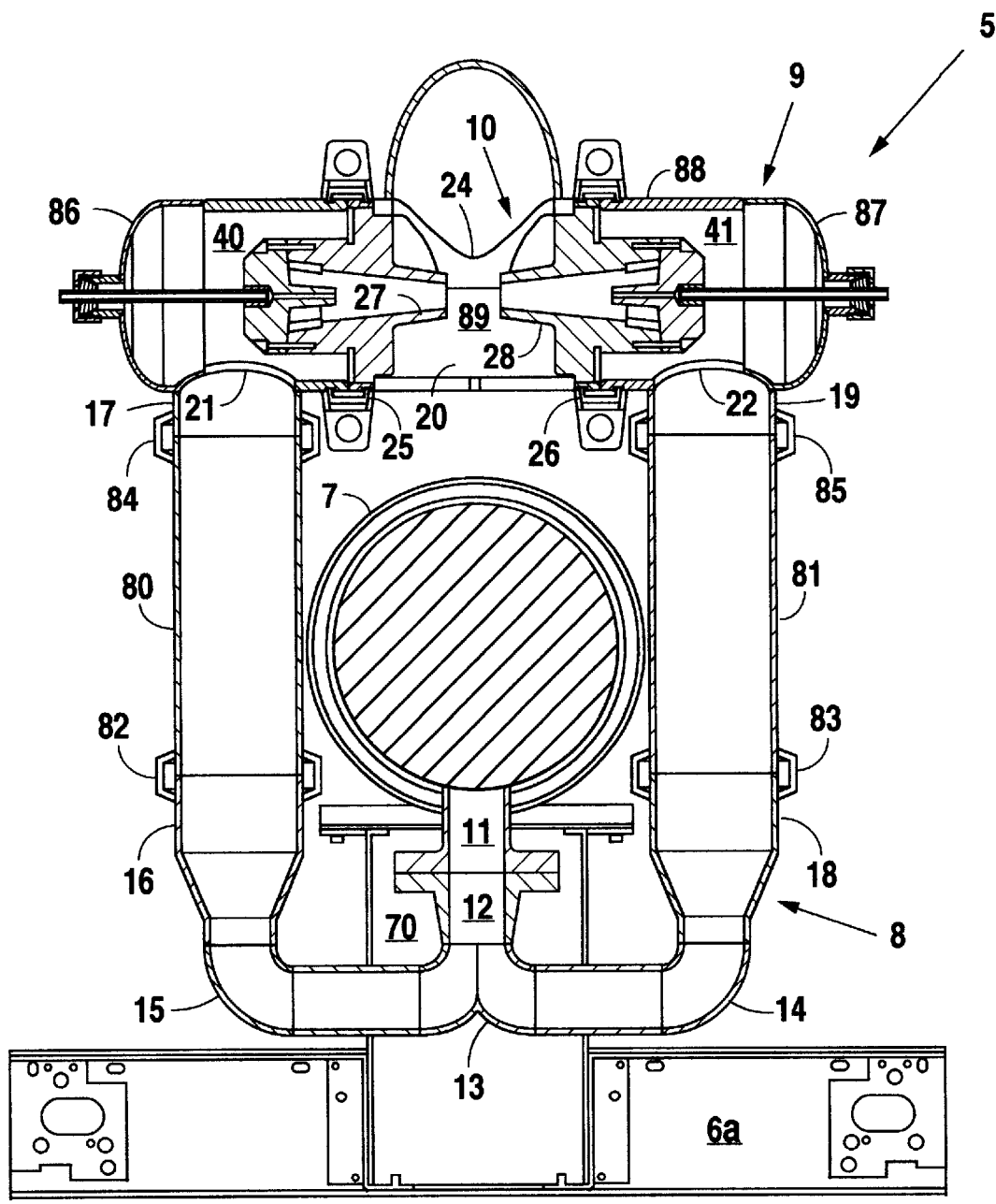
FIG. 6 is a cross-sectional view illustrating a fluid delivery system having a vortex nozzle assembly housed therein.
Figure 7:
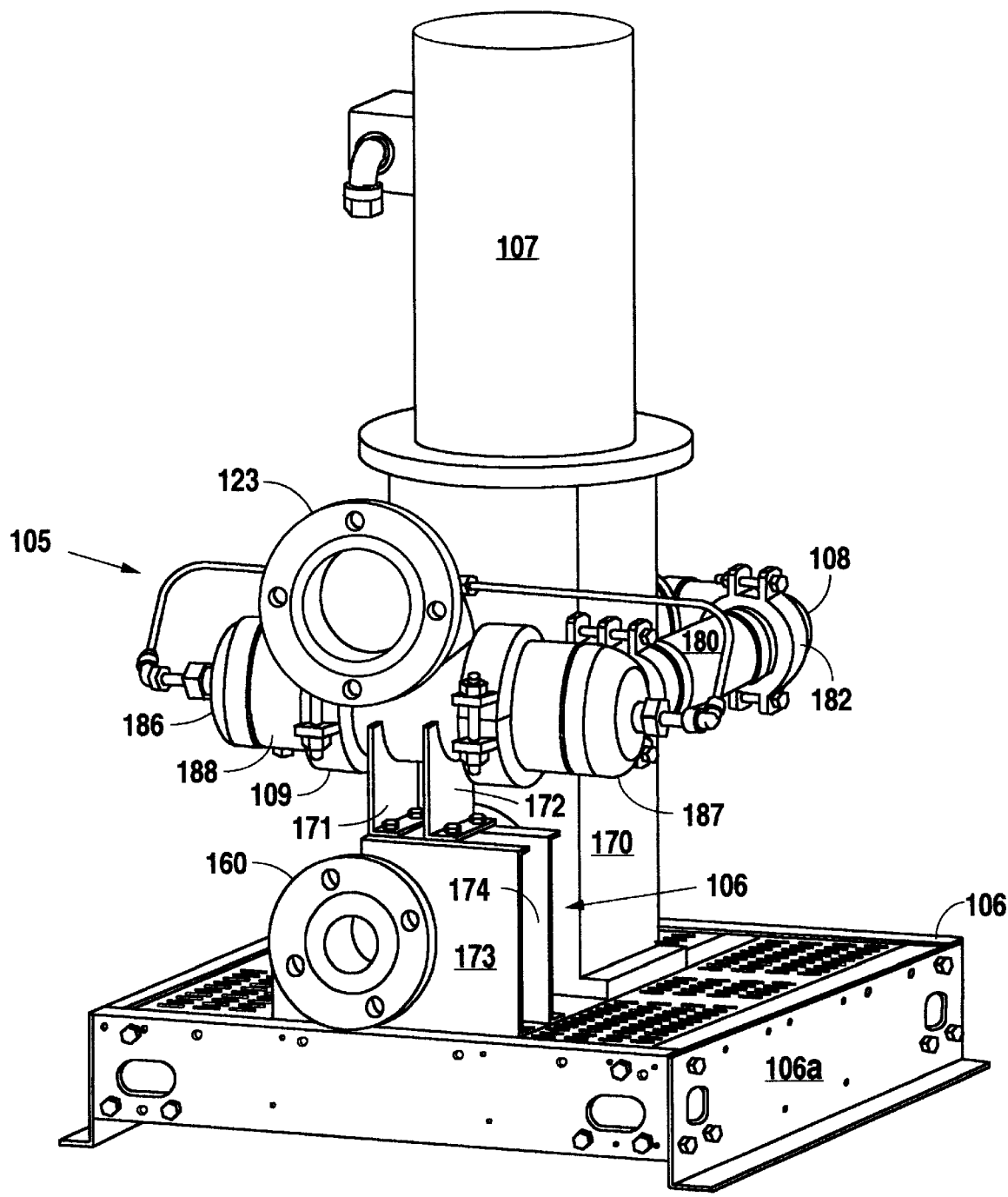
FIG. 7 is a perspective view illustrating a fluid delivery system according to a second embodiment of an apparatus for treating fluids.
Figure 8:
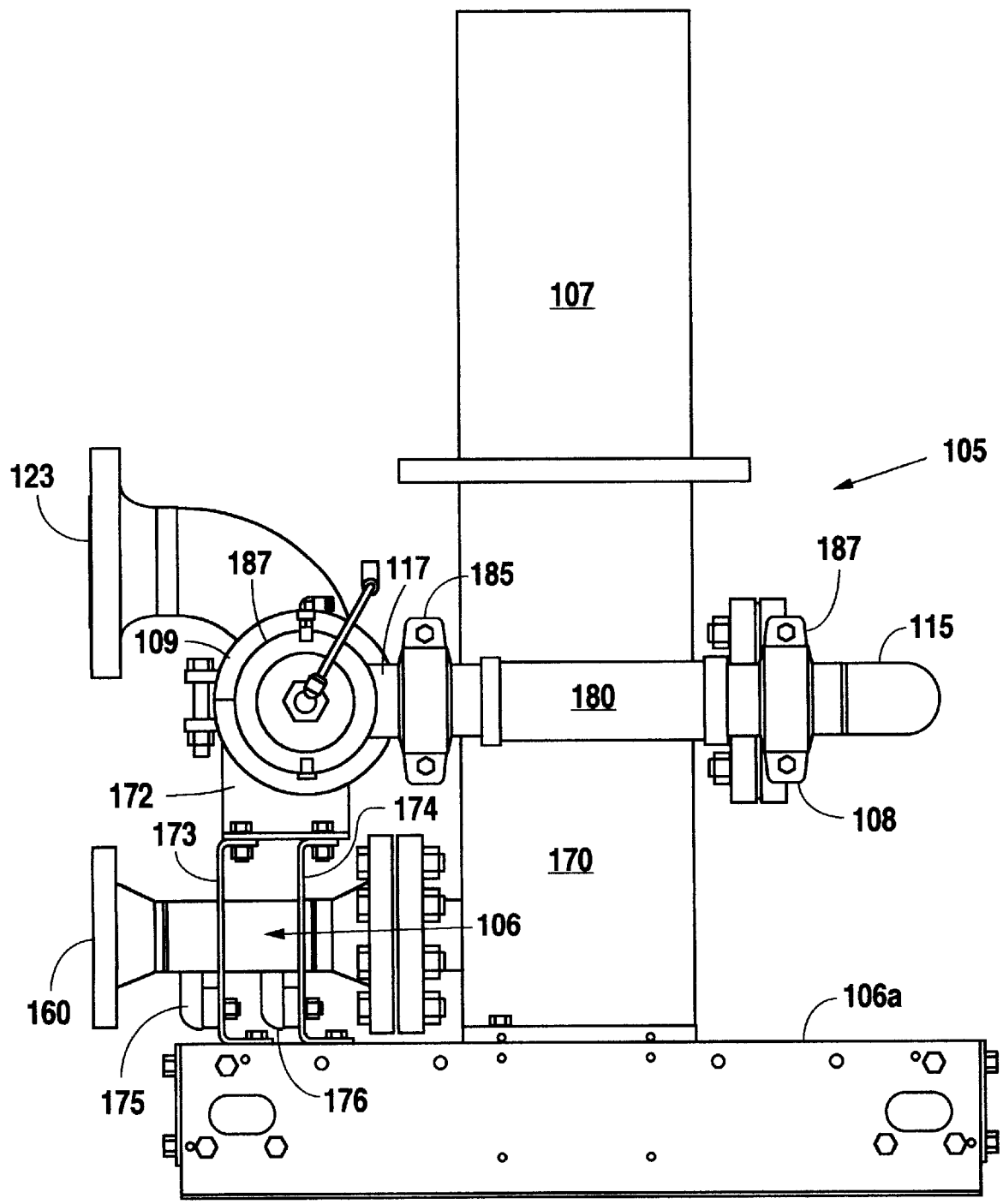
FIG. 8 is a side view illustrating a fluid delivery system according to a second embodiment of an apparatus for treating fluids.
Figure 9:
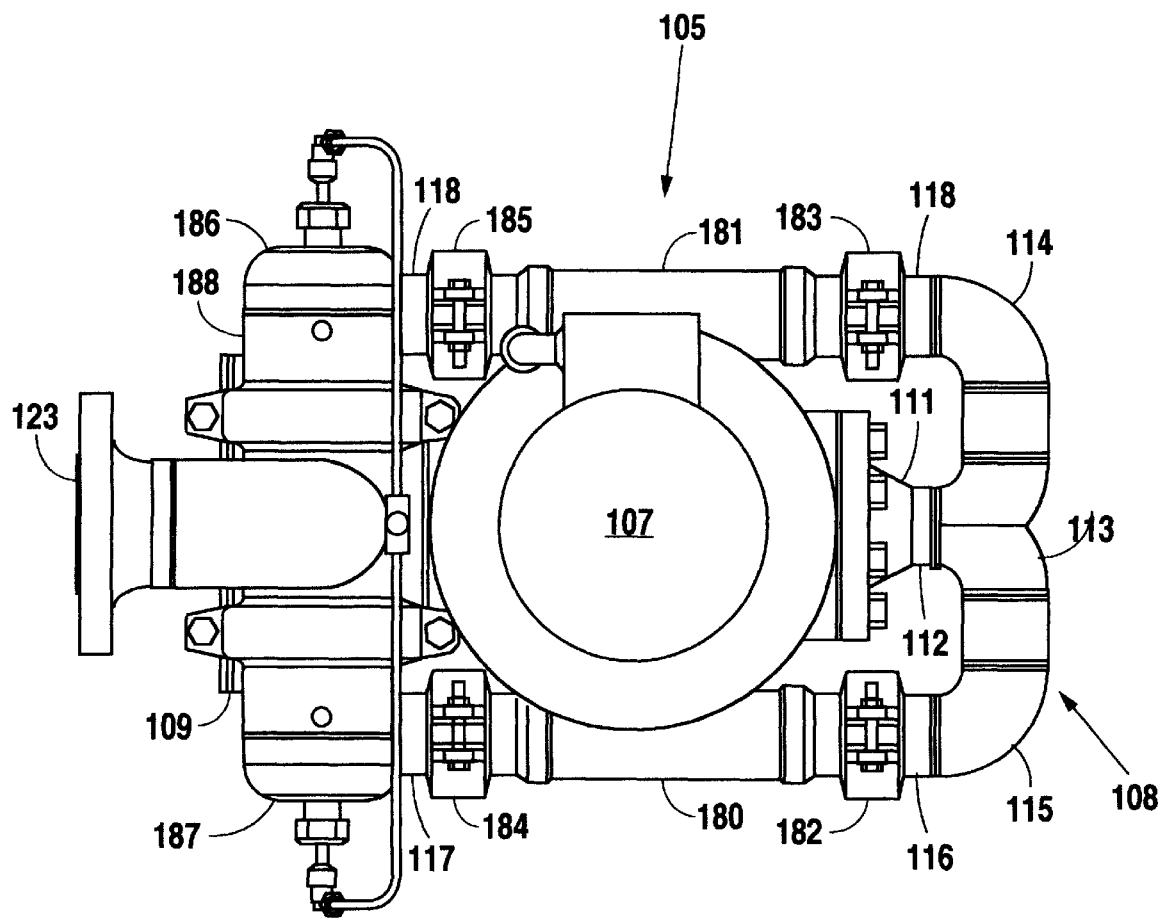
FIG. 9 is a top view illustrating a fluid delivery system according to a second embodiment of an apparatus for treating fluids.
Figure 10:
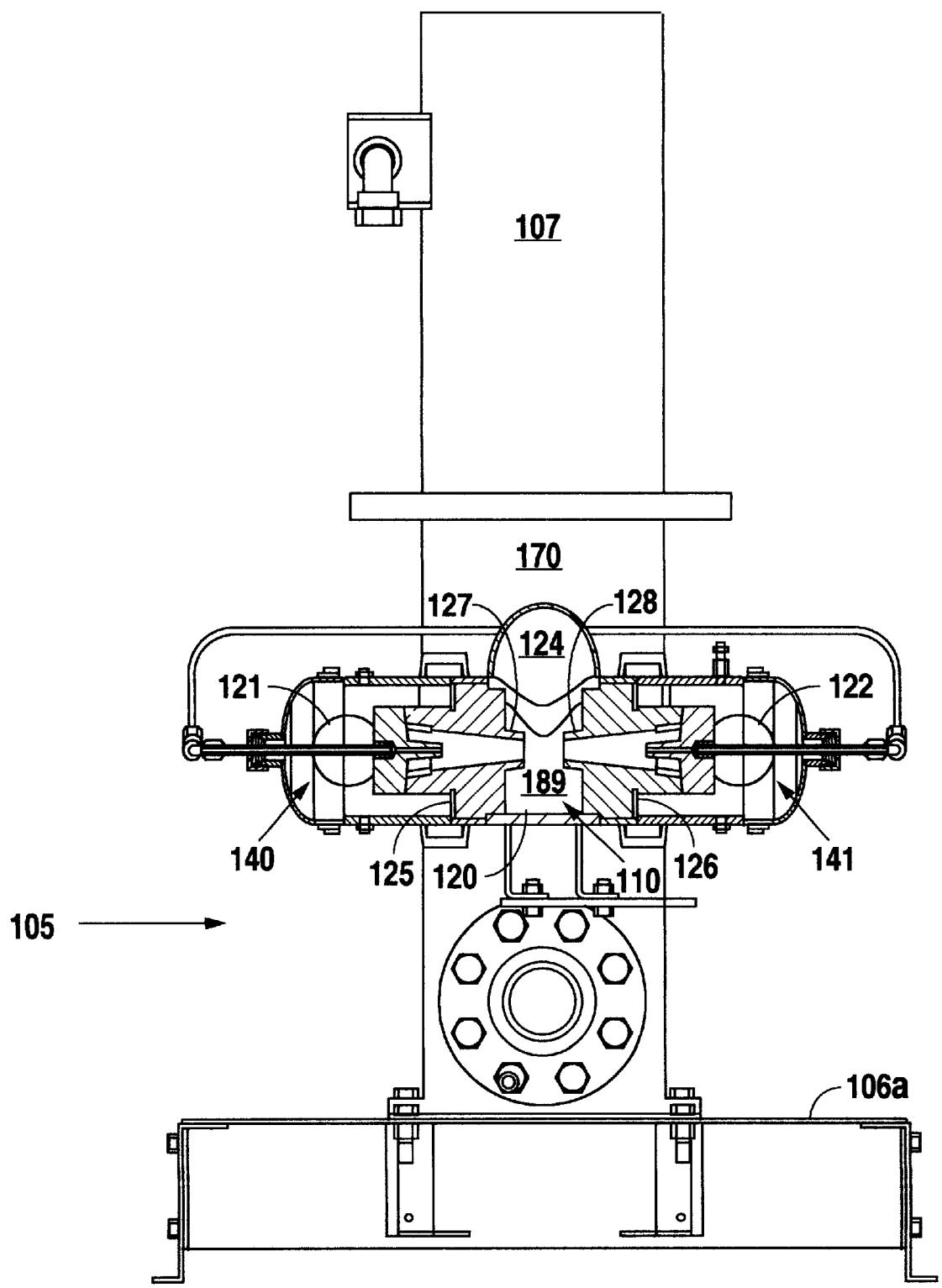
FIG. 10 is a front view in partial cross-section illustrating a fluid delivery system according to a second embodiment of an apparatus for treating fluids.
Figure 11:
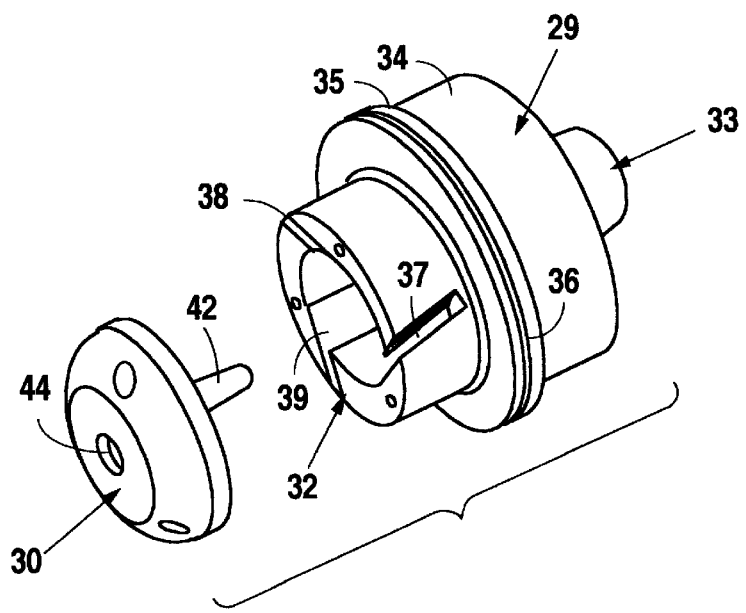
FIGS. 11 and 12 are perspective views illustrating a vortex nozzle of an apparatus for treating fluids.
Figure 12:
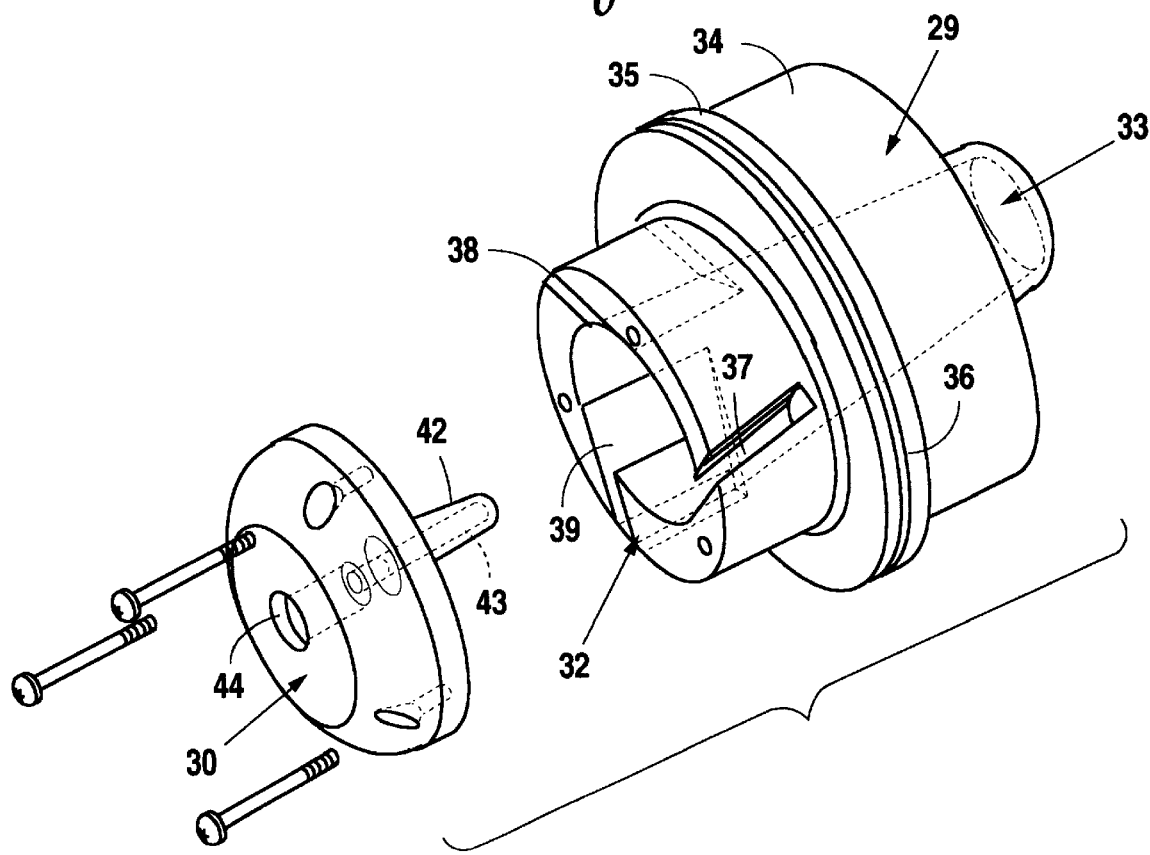
Figure 13:
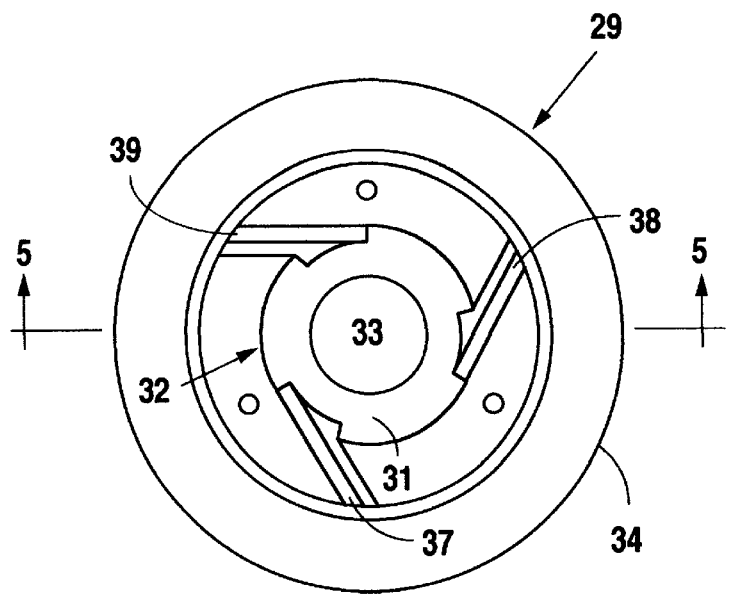
FIG. 13 is an elevation view illustrating an inlet side of a vortex nozzle body of a vortex nozzle.
Figure 14:
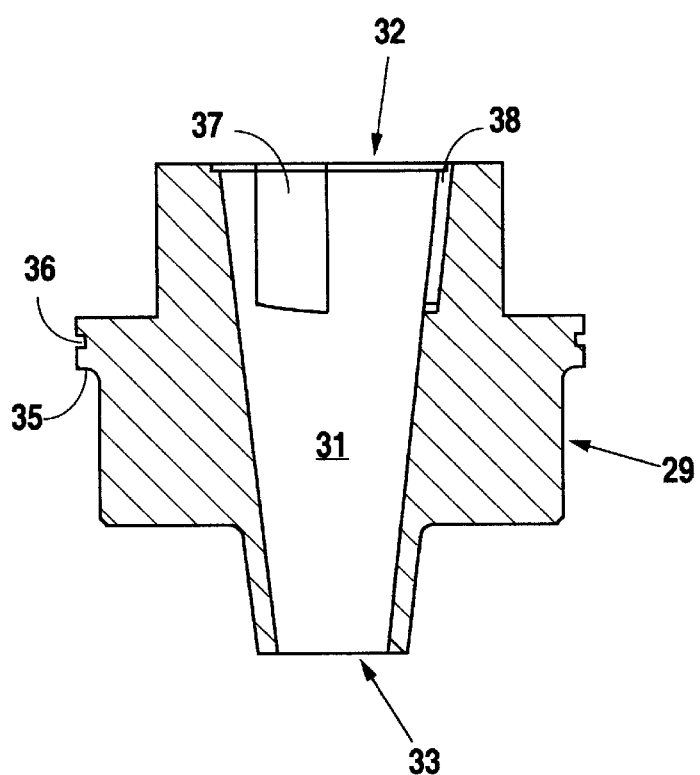
FIG. 14 is a cross-sectional view illustrating a vortex nozzle body of a vortex nozzle.

Referring now to FIGS. 3, 4, and 6, the manifold 8 includes an inlet 12, a flow divider 13, elbows 14 and 15, and flexible couplings 80 and 81. The inlet 12 connects to the outlet 11 of the pump housing 7a using any suitable means, such as a flange and fasteners, to receive a fluid flow from the pump housing 7a. The inlet 12 fits within an inlet of the flow divider 13 and is held therein by friction, welding, glue, or the like, to deliver fluid into the flow divider 13. The flow divider 13 receives the fluid flow and divides the fluid flow into a first fluid flow and a second fluid flow by changing the direction of the fluid flow substantially perpendicular relative to the flow from the inlet 12. The flow divider 13 in this first embodiment is 'Y' shaped to allow for a smoother transition of the fluid flow from the inlet 12 into the first fluid flow and the second fluid flow. The flow divider 13 therefore prevents the abrupt stopping and redirection of the fluid flow, thereby reducing the discharge head pressure created by this type of redirection and further allowing for an increased pressure into the two resulting fluid flows.

The flow divider 13 connects to the elbows 14 and 15 by friction, welding, glue, or the like, to deliver the first fluid flow to the elbow 14 and the second fluid flow to the elbow 15. The elbow 14 reverses the first fluid flow received from the flow divider 13 and delivers the first fluid flow to the flexible coupling 80. The elbow 14 includes an elbow fitting 16 that connects to flexible coupling 80 by means of a coupling bracket 82. Similarly, the elbow 15 reverses the second fluid flow received from the flow divider 13 and delivers the second fluid flow to the flexible coupling 81. The elbow 15 includes an elbow fitting 18 that connects to flexible coupling 81 by means of a coupling bracket 83.

The housing 9 includes a housing fitting 17, as illustrated in FIG. 3, that connects to the flexible coupling 80 by means of a coupling bracket 84 to permit the delivery of the first fluid flow to the housing 9. The housing 9 further includes a housing fitting 19 that connects to the flexible coupling 81 by means of a coupling bracket 85 to permit the delivery of the second fluid flow to the housing 9. The flexible couplings 80 and 81 in this first embodiment are constructed of a flexible material designed to reduce or eliminate the transfer of sound to the housing 9. However, the flexible couplings 80 and 81 and the coupling brackets 82–85 are only necessary in applications where sound prevention is desirable. In non-sound sensitive applications, two flanged pipes or other means of directing fluid flows from the elbows 14 and 15 to housing 9 may be utilized. Also, although this first embodiment discloses a manifold 8 for delivering fluid flow into the housing 9, those of ordinary skill in the art will recognize many other suitable and equivalent means, such as two pumps and separate connections to the housing 9 or a single pump delivering fluid into side portions of the housing 9 instead of end portions.

The housing 9 includes inlets 21 and 22, an outlet 23, detents 25 and 26, end caps 86 and 87, and a cylinder 88. The housing 9 defines a bore 20 along its central axis and a bore 24 positioned approximately central to the midpoint of the housing 9 that communicates with the bore 20. The housing 9 attaches to flexible the couplings 80 and 81 by means of the coupling brackets 84 and 85 to receive the first fluid flow at the inlet 21 and the second fluid flow at the inlet 22. The outlet 23 is connectable to any suitable fluid storage or delivery system using well-known piping, and, in this first embodiment, the outlet 23 is an elbow that quickly redirects the fluid flow horizontally so as to reduce outlet pressure loss by preventing a discharge head pressure in the bore 20 and the bore 24 while maintaining a flooded condition within the bore 20 and the bore 24. Although the upward discharge design is desirable, designs with other angles may also be used.

The vortex nozzle assembly 10 resides within the bore 20 and, in this first embodiment, includes vortex nozzles 27 and 28, which are positioned within the bore 20 of the housing 9 in opposed relationship to impinge the first fluid flow with the second fluid flow, thereby treating the flowing fluid. The vortex nozzle 27 inserts into the bore 20 until it abuts the detent 25, and the end cap 86 attaches to the cylinder 88 using any suitable means, such as friction, a coupling, welding, glue, or the like, to form a first side of the housing 9. With the vortex nozzle 27 inserted into the housing 9, the vortex nozzle 27 and the housing 9 define a cavity 40 that receives the first fluid flow from inlet 21 and delivers the first fluid flow to the vortex nozzle 27. Similarly, the vortex nozzle 28 inserts into the bore 20 until it abuts the detent 26, and the end cap 87 attaches to the cylinder 88 using any suitable means, such as friction, a coupling, welding, glue, or the like, to form a second side of the housing 9. With the vortex nozzle 28 inserted into the housing 9, the vortex nozzle 28 and the housing 9 define a cavity 41 that receives the second fluid flow from the inlet 22 and delivers the second fluid flow to the vortex nozzle 28. Furthermore, the positioning of the vortex nozzles 27 and 28 in opposed relationship within the bore 20 creates a collision chamber 89 where the impingement of the first fluid flow with the second fluid flow occurs.

As illustrated in FIGS. 5 and 11–14, the vortex nozzle 27 includes a nozzle body 29 and an end cap 30. For the purposes of disclosure, only the vortex nozzle 27 will be described herein; however, it should be understood that the vortex nozzle 28 is identical in design, construction, and operation to the vortex nozzle 27 and is merely positioned within the bore 20 of the housing 9 in opposed relationship to the vortex nozzle 27 to facilitate impingement of the second fluid flow with the first fluid flow. Furthermore, although the following design for the vortex nozzle 27 is preferred, those of ordinary skill in the art will recognize that the vortex nozzles disclosed in U.S. Pat. Nos. 4,261,521 and 5,435,913 may also be utilized.

The nozzle body 29 in this first embodiment is substantially cylindrical in shape and includes tapered passageway 31 located axially therethrough. The tapered passageway 31 includes an inlet side 32 and decreases in diameter until terminating at an outlet side 33. The taper of the tapered passageway 31 is greater than 0° and less than 90°, however, more preferable tapers are greater than 5° and less than 60°.

The nozzle body 29 includes a shoulder 34 having a raised portion 35 with a groove 36 therein. The shoulder 34 is sized to frictionally engage the interior surface of the housing 9, while the raised portion 35 abuts detent 25, thereby rendering the vortex nozzle 27 exactly placeable within the housing 9. The groove 36 receives a seal therein to fluidly seal the nozzle body 29 and, thus, the vortex nozzle 27 within the housing 9.

The nozzle body 29 further includes ports 37–39 for introducing the first fluid flow into the tapered passageway 31 of the vortex nozzle 27. In this first embodiment, the ports 37–39 are substantially trapezoidal in shape and are equally spaced radially about the nozzle body 29 beginning at the inlet side 32. Although this first embodiment discloses three substantially trapezoidally-shaped ports 37–39, those of ordinary skill in the art will recognize that only one port is actually necessary and that any number of ports may be utilized. Furthermore, the ports 37–39 may be any shape suitable to deliver fluid into the tapered passageway 31, such as elliptical, triangular, D-shaped, and the like.

In this first embodiment, the ports 37–39 are tangential to the inner surface of the tapered passageway 31 and enter the tapered passageway 31 at the same angle as the taper of the tapered passageway 31, which enhances the delivery of the first fluid flow from the cavity 40 into the tapered passageway 31 and, ultimately, the distribution of the first fluid flow around the tapered passageway 31. Although this first embodiment discloses tangential ports 37–39 angled with the taper of the tapered passageway 31, those of ordinary skill in the art will recognize that the ports 37–39 can enter the tapered passageway 31 at any angle relative to the taper of the tapered passageway 31. Additionally, the end of the nozzle body 29 defining the inlet side 32 includes a taper the same angle as the taper of the tapered passageway 31 to ensure the ports 37–39 each define a substantially trapezoidal shape.

The end cap 30 abuts the end of the nozzle body 29 defining the inlet side 32 to seal the inlet side 32, thereby permitting fluid to enter into the tapered passageway 31 through ports 37–39 only. Accordingly, the inner face of the end cap 30 that abuts the end of the nozzle body 29 defining the inlet side 32 includes a taper the same angle as the taper of the tapered passageway 31. The end cap 30 attaches to the end of the nozzle body 29 defining the inlet side 32 using any suitable means, such as fastening screws, glue, or the like. However, it should be understood that the end cap 30 may be formed integrally with the nozzle body 29. Although this first embodiment discloses the inner face of the end cap 30 and the end of nozzle body 29 defining the inlet side 32 as including a taper the same angle as the taper of the tapered passageway 31 to ensure the ports 37–39 each define a substantially trapezoidal shape, those of ordinary skill in the art will recognize that the inner face of the end cap 30 and the end of nozzle body 29 defining the inlet side 32 may reside at any angle.

Figure 5:
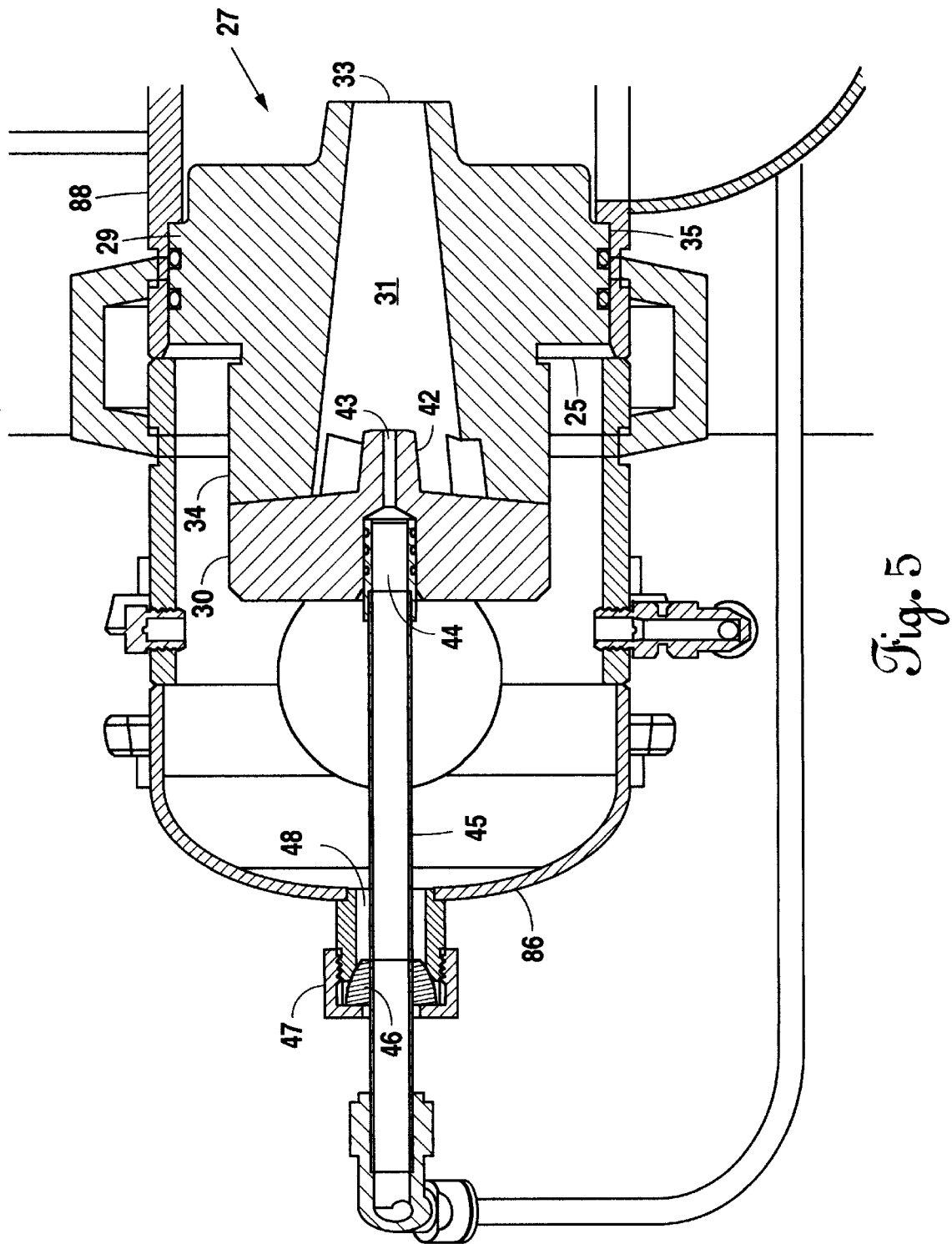
FIG. 5 is a partial cross-sectional view illustrating a vortex nozzle of a vortex nozzle assembly housed in a fluid delivery system according to a first embodiment.

The end cap 30 includes a boss 42 formed integrally therewith or attached thereto at approximately the center of the inner face of the end cap 30. In this first embodiment, the boss 42 is conical in shape and extends into the tapered passageway 31 to adjust the force vector components of the fluid entering the tapered passageway 31. A passageway 43 through the boss 42 communicates with a cavity 44 at approximately the center of the outer face of the end cap 30. A conduit 45, as illustrated in FIG. 5, fits within the cavity 44 to permit measurement of vacuum within the tapered passageway 31. A conduit guide seal 46 fits within an end cap 47 that secures to the housing 9 over an aperture 48 using any suitable means, such as a threaded fitting, welding, or the like. Both the end cap 47 and the conduit guide seal 46 include an opening to allow the insertion of conduit 45 into the cavity 40 and thus the cavity 44. The conduit guide seal 46 is preferably constructed of a pliable, compliant, or elastomeric material, which permits greater movement of the conduit 45 within the cavity 40 and thus a greater ability to seat the conduit 45 within the cavity 44. The conduit guide seal 46 is self-actuating and works together with the end cap 47 such that fluid pressure on the inner side of the conduit guide seal 46 forces the conduit guide seal 46 against the end cap 47, thereby deforming the conduit guide seal 46 over the end cap 47 and the conduit 45 to thus create a fluid tight seal.

The first fluid flow delivered from the cavity 40 to the vortex nozzle 27 enters the tapered passageway 31 via the ports 37–39. Delivering the first fluid flow to the ports 37–39 via the cavity 40 provides a significant advantage through the elimination of the need to orient the ports 37–39 with respect to specific fluid entrance points. The tapered passageway 31 receives the fluid therein and imparts a rotation to the fluid, thereby creating a first rotating fluid flow that travels down the tapered passageway 31 and exits its outlet side 33. Each port 37–39 delivers a portion of the fluid flow both tangentially and normally to the tapered passageway 31. This tangential and normal entry of the fluid in multiple bands distributes the fluid uniformly in a thin rotating film about the tapered passageway 31, which minimizes fluid losses due to internal turbulent motion. Accordingly, the vortex nozzle 27 provides for a more intense and stable impact of rotating fluid flow exiting the outlet side 33 of the tapered passageway 31.

Additionally, in this first embodiment, the cross-sectional area of the ports 37–39 is less than the cross-sectional area of the inlet side 32 of the tapered passageway 31, which creates a vacuum within the rotating fluid flow. Nevertheless, those of ordinary skill in the art will recognize that the size of ports 37–39 may be varied based upon particular application requirements. The amount of vacuum created by the ports 37–39 may be adjusted utilizing the boss 42 to alter the force vectors of the rotating fluid flow. Illustratively, increasing the size of the boss 42 (i.e., either diameter or length) decreases the volume within the tapered passageway 31 fillable with fluid, thereby increasing the vacuum and, thus, providing the rotating fluid flow with more downward and outward force vector components.

In operation, the manifold 8 is assembled as previously described and connected to the pump assembly 7. Each of the vortex nozzles 27 and 28 are inserted in opposed relationship into the housing 9 as previously described, and the housing 9 is connected to the manifold 8. The pump assembly 7 pumps fluid from a fluid source and delivers the fluid into the manifold 8, which divides the fluid into the first fluid flow and the second fluid flow. The manifold 8 delivers the first fluid flow into the cavity 40 of the housing 9 and the second fluid flow into the cavity 41 of the housing 9. The first fluid flow enters the vortex nozzle 27 from the cavity 40 via the ports 37–39 of the vortex nozzle 27. The vortex nozzle 27 receives the fluid therein and imparts a rotation to the fluid, thereby creating a first rotating fluid flow that travels down the vortex nozzle 27 and exits its outlet side 33 into the collision chamber 89. Similarly, the second fluid flow enters the vortex nozzle 28 from the cavity 41 via the ports of the vortex nozzle 28. The vortex nozzle 28 receives the fluid therein and imparts a rotation to the fluid, thereby creating a second rotating fluid flow that travels down the vortex nozzle 28 and exits its outlet side into the collision chamber 89. Due to the opposed relationship of the vortex nozzles 27 and 28, the first rotating fluid flow impinges the second rotating fluid flow within the collision chamber 89, resulting in the treatment of the fluid through the breaking of molecular bonding in the fluid or the reduction in size of solid particulates within the fluid. The treated fluid then exits the outlet 23 of the housing 9 and travels to a suitable fluid storage or delivery system.

It is preferable to maintain discharges from the vortex nozzles 27 and 28 sufficient to sustain a flooded condition within the collision chamber 89. In addition, the upward discharge from the collision chamber 89 into the outlet 23 ensures the collision chamber 89 remains flooded during the operation of the vortex nozzles 27 and 28. This enhances the effectiveness of the vortex nozzles 27 and 28 because rotating fluid flows discharged from the vortex nozzles 27 and 28 are not disrupted by previously discharged fluid flows that may splash back into the collision chamber 89 during entry into the outlet 23 as can occur in non-flooded collision chamber designs.

As illustrated in FIGS. 7–10, an apparatus 105 for treating fluids according to a second embodiment includes a pump 107 oriented in a vertical position so as to allow staging of impellers, which provides for greater pressure while requiring less horsepower. Although vertically oriented pumps have pressure limitations, they nevertheless are sufficient for most applications while providing a distinct power saving advantage. The pump 107 includes an inlet 160, which provides a connection point for a fluid source, and an outlet 111. The pump 107 is any pump capable of pumping fluid from a fluid source through the apparatus 105. Fluid, in this first embodiment, is any flowable liquid or gas or solid particulates deliverable under pressurized gas or liquid flow. Although this second embodiment discloses a pump 107 for delivering fluids, those of ordinary skill in the art will recognize many other suitable and equivalent means, such as pressurized gas canisters.

The apparatus 105 for treating fluids includes a frame 106 and a pump support 170, both of which are mounted to a base 106a using any suitable means, such as riveting, fastening screws, nuts and bolts, and the like. The pump support 170 supports the pump 107, while the frame 106 supports the inlet 160 of the pump 107 via braces 173 and 174 and brackets 175 and 176. The frame 106 via the braces 173 and 174 and the brackets 175 and 176 supports the inlet 160 so that the weight of any plumbing used in connecting the fluid source to the pump 107 does not rest upon the pump 107, which protects the pump seal, pump bearings, and the pump shaft from damage caused by vertical movement resulting from excess weight on the connection between a pump motor and pump impellers. Although not illustrated, those of ordinary skill in the art will recognize that the apparatus 105 may include a cabinet similar to cabinet 50.

The apparatus 105 for treating fluids includes a housing 109 having a vortex nozzle assembly 110 disposed therein and a manifold 108 that fluidly connects the outlet 111 of the pump 107 to the housing 109. The frame 106 supports the housing 109 via the braces 173 and 174 and brackets 171 and 172. The frame 106 via the braces 173 and 174 and the brackets 171 and 172 supports the housing 109 and thus the manifold 108 so that their weight does not rest upon the pump 107, which protects the pump seal, pump bearings, and the pump shaft from damage caused by vertical movement resulting from excess weight on the connection between the pump motor and pump impellers.

The manifold 108 in this second embodiment is located in a substantially horizontal plane and includes an inlet 112, a flow divider 113, elbows 114 and 115, and flexible couplings 180 and 181. The inlet 112 connects to the outlet 111 of the pump 107 using any suitable means, such as a flange and fasteners, to receive a fluid flow from the pump 107. The inlet 112 fits within an inlet of the flow divider 113 and is held therein by friction, welding, glue, or the like, to deliver fluid into the flow divider 113. The flow divider 113 receives the fluid flow and divides the fluid flow into a first fluid flow and a second fluid flow by changing the direction of the fluid flow substantially perpendicular relative to the flow from the inlet 112. The flow divider 113 in this second embodiment is 'Y' shaped to allow for a smoother transition of the fluid flow from the inlet 112 into the first fluid flow and the second fluid flow. The flow divider 113 therefore prevents the abrupt stopping and redirection of the fluid flow, thereby reducing the discharge head pressure created by this type of redirection and further allowing for an increased pressure into the two resulting fluid flows.

The flow divider 113 connects to the elbows 114 and 115 by friction, welding, glue, or the like, to deliver the first fluid flow to the elbow 114 and the second fluid flow to the elbow 115. The elbow 1 14 reverses the first fluid flow received from the flow divider 1 13 and delivers the first fluid flow to the flexible coupling 180. The elbow 114 includes an elbow fitting 116 that connects to flexible coupling 180 by means of a coupling bracket 182. Similarly, the elbow 115 reverses the second fluid flow received from the flow divider 113 and delivers the second fluid flow to the flexible coupling 181. The elbow 115 includes an elbow fitting 118 that connects to flexible coupling 181 by means of a coupling bracket 183.

The housing 109 includes a housing fitting 117 that connects to the flexible coupling 180 by means of a coupling bracket 184 to permit the delivery of the first fluid flow to the housing 109. The housing 109 further includes a housing fitting 119 that connects to the flexible coupling 181 by means of a coupling bracket 185 to permit the delivery of the second fluid flow to the housing 109. The flexible couplings 180 and 181 in this second embodiment are constructed of a flexible material designed to reduce or eliminate the transfer of sound to the housing 109. However, the flexible couplings 180 and 181 and the coupling brackets 182–185 are only necessary in applications where sound prevention is desirable. In non-sound sensitive applications, two flanged pipes or other means of directing fluid flows from the elbows 114 and 115 to housing 109 may be utilized. Also, although this first embodiment discloses a manifold 108 for delivering fluid flow into the housing 109, those of ordinary skill in the art will recognize many other suitable and equivalent means, such as two pumps and separate connections to the housing 109 or a single pump delivering fluid into side portions of the housing 109 instead of end portions.

The housing 109 includes inlets 121 and 122, an outlet 123, detents 125 and 126, end caps 186 and 187, and a cylinder 188. The housing 109 defines a bore 120 along its central axis and a bore 124 positioned approximately central to the midpoint of the housing 109 that communicates with the bore 120. The housing 109 attaches to flexible the couplings 180 and 181 by means of the coupling brackets 184 and 185 to receive the first fluid flow at the inlet 121 and the second fluid flow at the inlet 122. The outlet 123 is connectable to any suitable fluid storage or delivery system using well-known piping, and, in this first embodiment, the outlet 123 is an elbow that quickly redirects the fluid flow horizontally so as to reduce outlet pressure loss by preventing a discharge head pressure in the bore 120 and the bore 124 while maintaining a flooded condition within the bore 120 and the bore 124. Although the upward discharge design is desirable, designs with other angles may also be used.

The vortex nozzle assembly 110 resides within the bore 120 and, in this second embodiment, includes vortex nozzles 127 and 128, which are positioned within the bore 120 of the housing 109 in opposed relationship to impinge the first fluid flow with the second fluid flow, thereby treating the flowing fluid. The vortex nozzle 127 inserts into the bore 120 until it abuts the detent 125, and the end cap 186 attaches to the cylinder 188 using any suitable means, such as friction, a coupling, welding, glue, or the like, to form a first side of the housing 109. With the vortex nozzle 127 inserted into the housing 109, the vortex nozzle 127 and the housing 109 define a cavity 140 that receives the first fluid flow from inlet 121 and delivers the first fluid flow to the vortex nozzle 127.

Similarly, the vortex nozzle 128 inserts into the bore 120 until it abuts the detent 126, and the end cap 187 attaches to the cylinder 188 using any suitable means, such as friction, a coupling, welding, glue, or the like, to form a second side of the housing 9. With the vortex nozzle 128 inserted into the housing 109, the vortex nozzle 128 and the housing 109 define a cavity 141 that receives the second fluid flow from the inlet 122 and delivers the second fluid flow to the vortex nozzle 128. Furthermore, the positioning of the vortex nozzles 127 and 128 in opposed relationship within the bore 120 creates a collision chamber 189 where the impingement of the first fluid flow with the second fluid flow occurs. The vortex nozzles 127 and 128 are identical design, construction, and operation to the vortex nozzles 27 and 28 as previously described with reference to FIGS. 5 and 11–14. Alternatively, the vortex nozzles disclosed in U.S. Pat. Nos. 4,261,521 and 5,435,913 may also be utilized.

In operation, the manifold 108 is assembled as previously described and connected to the pump 107. Each of the vortex nozzles 127 and 128 are inserted in opposed relationship into the housing 109 as previously described, and the housing 109 is connected to the manifold 108. The pump 107 pumps fluid from a fluid source and delivers the fluid into the manifold 108, which divides the fluid into the first fluid flow and the second fluid flow. The manifold 108 delivers the first fluid flow into the cavity 140 of the housing 109 and the second fluid flow into the cavity 141 of the housing 109. The first fluid flow enters the vortex nozzle 127 from the cavity 140 via the ports of the vortex nozzle 127. The vortex nozzle 127 receives the fluid therein and imparts a rotation to the fluid, thereby creating a first rotating fluid flow that travels down the vortex nozzle 127 and exits its outlet side 133 into the collision chamber 189. Similarly, the second fluid flow enters the vortex nozzle 128 from the cavity 141 via the ports of the vortex nozzle 128. The vortex nozzle 128 receives the fluid therein and imparts a rotation to the fluid, thereby creating a second rotating fluid flow that travels down the vortex nozzle 128 and exits its outlet side into the collision chamber 189. Due to the opposed relationship of the vortex nozzles 127 and 128, the first rotating fluid flow impinges the second rotating fluid flow within the collision chamber 189, resulting in the treatment of the fluid through the breaking of molecular bonding in the fluid or the reduction in size of solid particulates within the fluid. The treated fluid then exits the outlet 123 of the housing 109 and travels to a suitable fluid storage or delivery system.

It is preferable to maintain discharges from the vortex nozzles 127 and 128 sufficient to sustain a flooded condition within the collision chamber 189. In addition, the upward discharge from the collision chamber 189 into the outlet 123 ensures the collision chamber 89 remains flooded during the operation of the vortex nozzles 127 and 128. This enhances the effectiveness of the vortex nozzles 127 and 128 because rotating fluid flows discharged from the vortex nozzles 127 and 128 are not disrupted by previously discharged fluid flows that may splash back into the collision chamber 189 during entry into the outlet 123 as can occur in non-flooded collision chamber designs.

Although the present invention has been described in terms of the foregoing embodiment, such description has been for exemplary purposes only and, as will be apparent to those of ordinary skill in the art, many alternatives, equivalents, and variations of varying degrees will fall within the scope of the present invention. That scope accordingly, is not to be limited in any respect by the foregoing description; rather, it is defined only by the claims that follow.

What is claimed is:

1. An apparatus for treating fluids, comprising:
 a pump including an inlet coupled with a fluid source and an outlet therefrom;
 a housing including a vortex nozzle assembly therein;
 a manifold coupled to the outlet of the pump and to the housing, wherein the manifold receives a flow of fluid from the pump and divides the flow of fluid into first and second fluid flows delivered to the housing; and
 a frame that supports the housing thereon.

2. The apparatus for treating fluids according to claim 1, further comprising a pump support that supports the pump thereon.

3. The apparatus for treating fluids according to claim 2, wherein the pump support is longer in length than the pump so that a pump motor of the pump may slide along the pump support when unfastened from a pump housing of the pump.

4. The apparatus for treating fluids according to claim 2, wherein the pump support is longer in length than the pump so that a pump motor of the pump may be rotated on the pump support when unfastened from a pump housing of the pump.

5. The apparatus for treating fluids according to claim 1, wherein the pump is oriented vertically to permit the staging of pump impellers.

6. The apparatus for treating fluids according to claim 1, wherein the frame supports the pump so that the weight of plumbing connecting the fluid source to the pump does not rest on the pump.

7. The apparatus for treating fluids according to claim 1, further comprising bushings between the frame and the housing to prevent the transfer of noise from the housing to the frame.

8. The apparatus for treating fluids according to claim 1, wherein the manifold comprises an inlet coupled with the outlet of the pump.

9. The apparatus for treating fluids according to claim 8, wherein the manifold comprises a flow divider coupled with the inlet, whereby the flow divider receives a fluid flow from the pump via the inlet and divides the fluid flow into a first fluid flow and a second fluid flow.

10. The apparatus for treating fluids according to claim 9, wherein the flow divider is Y-shaped to provide a smoother transition of the fluid flow from the inlet into the first fluid flow and the second fluid flow.

11. The apparatus for treating fluids according to claim 9, wherein the manifold comprises a first elbow coupled with the flow divider and adapted to receive the first fluid flow.

12. The apparatus for treating fluids according to claim 11, wherein the manifold comprises a second elbow coupled with the flow divider and adapted to receive the second fluid flow.

13. The apparatus for treating fluids according to claim 12, wherein the manifold comprises a second coupling coupled with the second elbow, whereby the second coupling receives the second fluid flow and delivers the second fluid flow to the housing.

14. The apparatus for treating fluids according to claim 13, wherein the second coupling is flexible to reduce the transfer of sound from the manifold to the housing.

15. The apparatus for treating fluids according to claim 11, wherein the manifold comprises a first coupling coupled with the first elbow, whereby the first coupling receives the first fluid flow and delivers the first fluid flow to the housing.

16. The apparatus for treating fluids according to claim 15, wherein the first coupling is flexible to reduce the transfer of sound from the manifold to the housing.

17. The apparatus for treating fluids according to claim 1, wherein the housing includes a first inlet that receives the first fluid flow and a second inlet that receives the second fluid flow.

18. The apparatus for treating fluids according to claim 17, wherein the vortex nozzle assembly comprises a first vortex nozzle positioned within the housing in opposed relationship to a second vortex nozzle also positioned within the housing.

19. The apparatus for treating fluids according to claim 18, wherein the housing defines a first cavity that delivers the first fluid flow to the first vortex nozzle, whereby the first vortex nozzle receives fluid therein and imparts a rotation to the fluid, thereby creating a first rotating fluid flow.

20. The apparatus for treating fluids according to claim 18, wherein the housing defines a second cavity that delivers the second fluid flow to the second vortex nozzle, whereby the second vortex nozzle receives fluid therein and imparts a rotation to the fluid, thereby creating a second rotating fluid flow.

21. The apparatus for treating fluids according to claim 18, wherein the positioning in the housing of the first vortex nozzle in opposed relationship to the second vortex nozzle defines a collision chamber where impingement of the first rotating fluid flow with the second rotating fluid flow occurs.

22. The apparatus for treating fluids according to claim 21, wherein the collision chamber communicates with an outlet of the housing.

23. The apparatus for treating fluids according to claim 22, wherein the outlet of the housing is located above the collision chamber to maintain a flooded condition within the collision chamber.

24. The apparatus for treating fluids according to claim 22, wherein the outlet of the housing comprises an elbow that horizontally redirects fluid flow from the collision chamber.

25. The apparatus for treating fluids according to claim 1, wherein the housing includes an aperture that permits the measurement of vacuum within the vortex nozzle assembly.

26. The apparatus for treating fluids according to claim 25, wherein the housing includes a self-actuating seal positioned over the aperture, whereby the self-actuating seal facilitates placement of one end of a conduit into a cavity of the vortex nozzle assembly.

27. The apparatus for treating fluids according to claim 26, wherein the self-actuating seal is a guide seal that fits within the aperture.

28. The apparatus according to claim 1, further comprising a cabinet positionable over the pump, the housing, the manifold and the frame.

29. The apparatus for treating fluids according to claim 28, wherein the cabinet includes a sound wall that reduces noise created by fluid moving within the manifold and the housing.

* * * * *